United States Patent
Yamamoto et al.

(10) Patent No.: US 10,753,492 B2
(45) Date of Patent: Aug. 25, 2020

(54) CHECK VALVE

(71) Applicant: MIURA CO., LTD., Matsuyama-shi, Ehime (JP)

(72) Inventors: Taisuke Yamamoto, Matsuyama (JP); Shinichiro Murakami, Matsuyama (JP)

(73) Assignee: MIURA CO., LTD., Matsuyama-Shi, Ehime (JP)

( * ) Notice: Subject to any disclaimer, the term of this patent is extended or adjusted under 35 U.S.C. 154(b) by 0 days.

(21) Appl. No.: 16/333,170

(22) PCT Filed: Jul. 27, 2017

(86) PCT No.: PCT/JP2017/027234
§ 371 (c)(1),
(2) Date: Mar. 13, 2019

(87) PCT Pub. No.: WO2018/074028
PCT Pub. Date: Apr. 26, 2018

(65) Prior Publication Data
US 2019/0219182 A1    Jul. 18, 2019

(30) Foreign Application Priority Data

Oct. 18, 2016 (JP) ................. 2016-204513
Oct. 18, 2016 (JP) ................. 2016-204514

(51) Int. Cl.
*F16K 15/06* (2006.01)
*B01D 35/153* (2006.01)

(52) U.S. Cl.
CPC .......... *F16K 15/063* (2013.01); *B01D 35/153* (2013.01); *B01D 2201/167* (2013.01); *Y10T 137/7932* (2015.04)

(58) Field of Classification Search
CPC ..... F16K 15/06; F16K 15/063; B01D 35/153; B01D 2201/167; Y10T 137/7932
(Continued)

(56) References Cited

U.S. PATENT DOCUMENTS 1,847,385 A * 3/1932 Dengler ............ F16K 1/34
251/86
2,418,777 A * 4/1947 Le Clair ............ B01D 29/21
210/134

(Continued)

FOREIGN PATENT DOCUMENTS

| JP | S55-061418 U | 4/1980 |
|----|--------------|--------|
| JP | 4014353 B2 | 9/2007 |
| JP | 4151007 B2 | 7/2008 |

*Primary Examiner* — William M Mccalister
(74) *Attorney, Agent, or Firm* — Muncy, Geissler, Olds & Lowe, P.C.

(57) ABSTRACT

A check valve includes a casing in which a fluid inlet, a valve chamber, a valve seat portion, and a fluid outlet are formed; a valve body disposed in the valve chamber; and an urging unit that urges the valve body to the valve seat portion side. The valve seat portion includes a first valve seat portion disposed on the fluid inlet side of the valve chamber, and a second valve seat portion disposed on an outer periphery side of the first valve seat portion. The valve body includes a first seal portion capable of coming into close contact with the first valve seat portion, a second seal portion capable of coming into close contact with the second valve seat portion, and a first hinge portion and a second hinge portion each of which is a starting point of bending of the second seal portion. The first seal portion is formed in a disk shape using a non-elastic material, and the second seal portion is formed in a recessed frusto-conical shape in which a surface on a lower bottom side is formed of an elastic material.

7 Claims, 9 Drawing Sheets

(58) Field of Classification Search
USPC .............. 251/84, 85, 167, 334; 137/542
See application file for complete search history.

(56) References Cited

U.S. PATENT DOCUMENTS

| | | | | |
|---|---|---|---|---|
| 3,029,835 | A * | 4/1962 | Biello | F16K 15/063 |
| | | | | 137/515.5 |
| 3,054,422 | A * | 9/1962 | Napolitano | F16K 1/385 |
| | | | | 137/509 |
| 3,164,364 | A * | 1/1965 | McColl | F16K 1/42 |
| | | | | 251/334 |
| 3,174,718 | A * | 3/1965 | McVey | F16K 1/425 |
| | | | | 251/334 |
| 4,044,993 | A * | 8/1977 | Wheeler | F16K 3/10 |
| | | | | 251/158 |
| 4,073,307 | A * | 2/1978 | Royce | B23P 15/001 |
| | | | | 137/15.02 |
| 4,671,487 | A * | 6/1987 | Bragin | F16K 3/184 |
| | | | | 251/204 |
| 5,662,142 | A | 9/1997 | Ansite | |
| 8,523,144 | B2 * | 9/2013 | Pechtold | F16K 1/46 |
| | | | | 251/176 |
| 2007/0278440 | A1 * | 12/2007 | Hoeptner, III | F16K 1/04 |
| | | | | 251/210 |
| 2010/0000919 | A1 * | 1/2010 | Kim | B01D 35/153 |
| | | | | 210/136 |
| 2020/0041014 | A1 * | 2/2020 | Davis | F16K 51/00 |

\* cited by examiner

CHECK VALVE

TECHNICAL FIELD

This application claims priority to Japanese Patent Application Nos. 2016-204513 and 2016-204514, filed Oct. 18, 2016, the contents of which are incorporated herein by reference.

The present invention relates to a check valve.

BACKGROUND ART

In the related art, a check valve for preventing a backflow of a fluid flowing from a primary side to a secondary side in a line, such as a pipe, through which a fluid flows has been known. Such a check valve has a valve body and a valve seat which can come into contact with the valve body. The valve body comes into contact with the valve seat by being urged from the secondary side to the primary side toward the valve seat.

When the fluid flows from the primary side to the secondary side, the valve body is separated from the valve seat against an urging force by a pressure of the fluid to allow the fluid to flow from the primary side to the secondary side. On the other hand, when the fluid is to flow from the secondary side to the primary side, the valve body comes into contact with the valve seat by the pressure of the fluid and the urging force, and blocks the flowing of the fluid from the secondary side to the primary side.

Incidentally, when foreign matter mixed in the fluid enters between the valve body and the valve seat, a contact operation of the valve body to the valve seat is inhibited by the foreign matter. Therefore, in a situation where the fluid is to flow backward from the secondary side to the primary side, a gap is generated between the valve body and the valve seat, and the backflow of the fluid cannot be completely blocked in some cases. Accordingly, a check valve capable of detecting entry of such foreign matter (dust) has been proposed (for example, see Patent Document 1). In addition, a technique has been proposed in which two check valves are disposed in series so that even if the contact operation of one check valve is inhibited by the foreign matter, the contact operation of the other check valve can block the backflow (for example, see Patent Document 2).

CITATION LIST

Patent Document
Patent Document 1: Japanese Patent No. 4014353
Patent Document 2: Japanese Patent No. 4151007

SUMMARY OF THE INVENTION

Technical Problem

In the check valve proposed in Patent Document 1, a pressure sensor is provided between a first valve seat with which a first valve comes into contact and a second valve seat with which a second valve, being formed with a diameter smaller than that of the first valve and superposed on a primary side of the first valve, comes into contact. In the proposed check valve, another pressure sensor is provided on a secondary side of the second valve. It is determined that the first valve is not sealed because a pressure difference between the two pressure sensors becomes small. Therefore, the proposed check valve does not actually solve inhibition of the contact operation by the foreign matter.

In addition, as proposed in Patent Document 2, although disposing two check valves is very useful, it is preferable to block the backflow by one check valve even if the foreign matter enters, from a viewpoint of increasing the number of operating parts and improving a maintainability.

Accordingly, an object of the present invention is to provide a check valve capable of maintaining a suitable sealing property even when foreign matter enters.

Solution to Problem

The present invention provides a check valve includes a casing in which a fluid inlet, a valve chamber, a valve seat portion, and a fluid outlet are formed; a valve body disposed in the valve chamber; and an urging unit that urges the valve body to the valve seat portion side, in which the valve seat portion includes a first valve seat portion disposed on the fluid inlet side of the valve chamber, and a second valve seat portion disposed on an outer periphery side of the first valve seat portion, wherein the first valve seat portion is formed as a vertical surface to an inflow direction of a fluid, wherein the second valve seat portion is formed to have a vertical surface to the inflow direction of the fluid, and have an inclined surface, being disposed along an outer periphery of the vertical surface, which gradually expands in diameter along the inflow direction of the fluid, wherein the valve body includes a first seal portion capable of coming into close contact with the first valve seat portion, a second seal portion that is disposed on an outer periphery side of the first seal portion and is capable of coming into close contact with the second valve seat portion, and a first hinge portion and a second hinge portion which are disposed at a position of the second seal portion and each of which is a starting point of bending of the second seal portion, wherein the first seal portion is formed in a disk shape using a non-elastic material, wherein the second seal portion: (i) is formed in a recessed frusto-conical shape in which a surface on a lower bottom side is formed of an elastic material; (ii) is formed to have a vertical seal portion disposed to face the vertical surface of the second valve seat portion and an inclined seal portion disposed to face the inclined surface of the second valve seat portion, and (iii) has an upper bottom that is formed to have a smaller diameter than a lower bottom and is disposed to be superposed on a surface of the first seal portion on the fluid outlet side, wherein the first hinge portion is formed as a groove cut out from a vertical surface of the vertical seal portion, in an annular shape along an outer periphery of the first seal portion, and wherein the second hinge portion is formed as a groove cut out from a surface of the inclined seal portion on the fluid outlet side, in an annular shape along an outer periphery of the vertical seal portion.

It is preferable that a thickness of the second seal portion gradually decreases toward the outer periphery side. It is preferable that the urging unit includes a plate-like body superposed on a surface of the valve body on the fluid outlet side, and an elastic member urging the plate-like body from the fluid outlet side toward the fluid inlet side.

The check valve according to the present invention may further include a filter disposed on a fluid inlet side of the casing. It is preferable that the filter includes (a) a filter body which includes a receiving surface portion disposed substantially perpendicular to a flow direction of the fluid and a side surface portion extending from an outer periphery of the receiving surface portion in a direction along the flow direction of the fluid, and in which a plurality of apertures are formed in the receiving surface portion and the side surface portion, and (b) a rib portion which extends from a tip end side of the side surface portion in a direction substantially perpendicular to the flow direction of the fluid and is supported by the casing.

It is preferable that a cut-out or a gap through which the fluid is capable of flowing is formed in the rib portion and a portion of the casing supporting the rib portion. It is preferable that the receiving surface portion has a concave portion recessed in the flow direction of the fluid. It is preferable that the filter body further includes a flange portion formed to extend from the tip end side of the side surface portion in a direction substantially perpendicular to the flow direction of the fluid, and the rib portion includes an annular plate member in which notches are formed on an outer periphery of the plate member at predetermined intervals, and is formed such that an outer periphery side of the plate member is bent to sandwich the flange portion.

Advantageous Effect of Invention

According to the present invention, it is possible to provide a check valve capable of maintaining a suitable sealing property even when foreign matter enters.

DESCRIPTION OF EMBODIMENTS

Hereinafter, an embodiment of a check valve according to the present invention will be described with reference to the drawings. The check valve is disposed in a pipe through which the fluid flows, and prevents a backflow of the fluid in the pipe. The check valve is connected between a primary side pipe (a fluid inlet side pipe) provided on an upstream side of the fluid and a secondary side pipe (a fluid outlet side pipe) provided on a downstream side of the fluid. The check valve opens the valve to allow flowing of the fluid from the primary side pipe to the secondary side pipe, and closes the valve to block flowing of the fluid from the secondary side pipe to the primary side pipe, thereby blocking the backflow.

The fluid flowing through the pipe may be mixed with foreign matter, and when the foreign matter enters a position of the check valve, a closing operation of the valve may be inhibited. The check valve according to the present embodiment minimizes an influence of the foreign matter even if the foreign matter enters, thereby preventing the backflow of the fluid.

Figure 1:
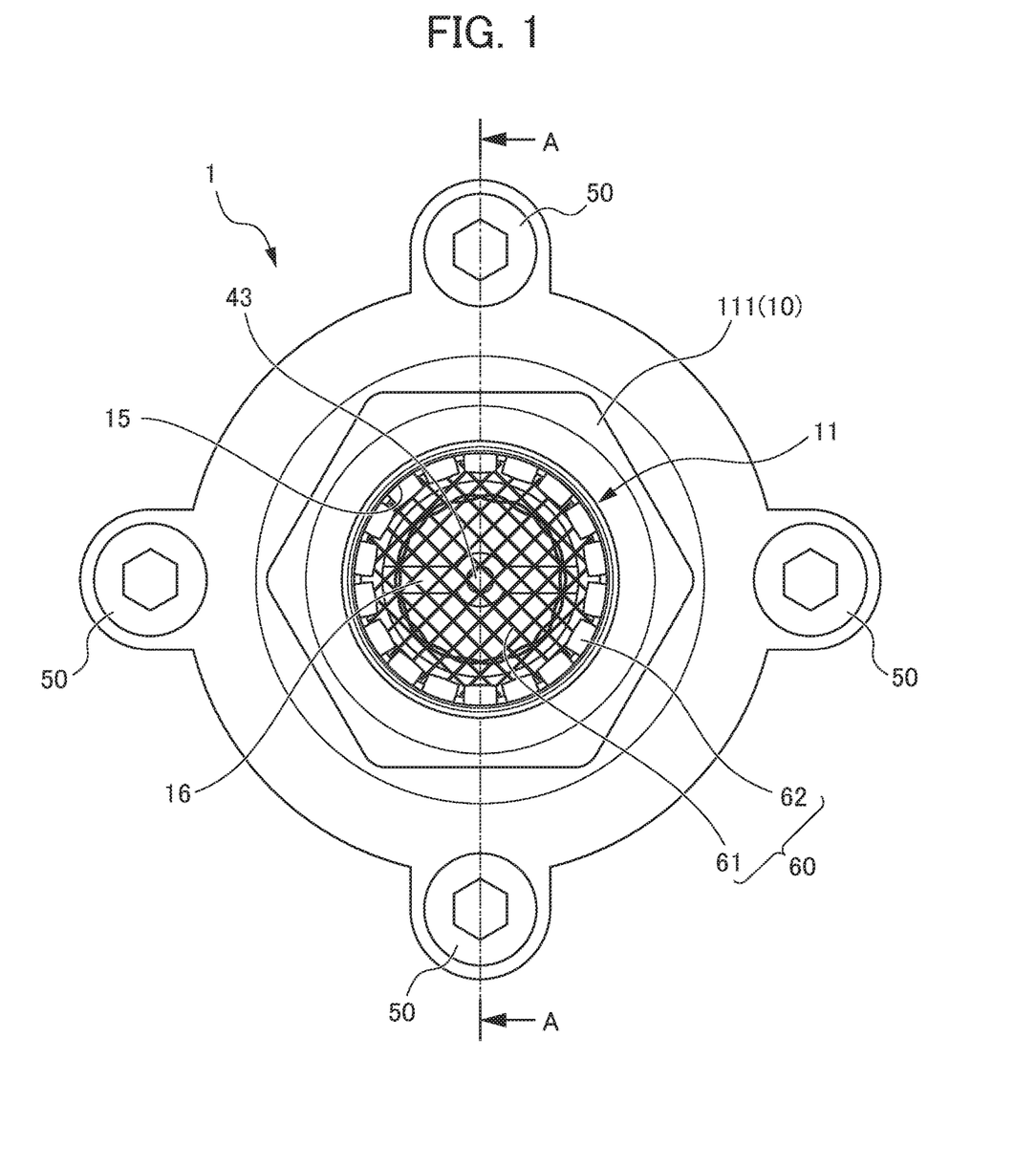
FIG. 1 is a plan view of a check valve according to an embodiment of the present invention as viewed from a primary side.
Figure 2:
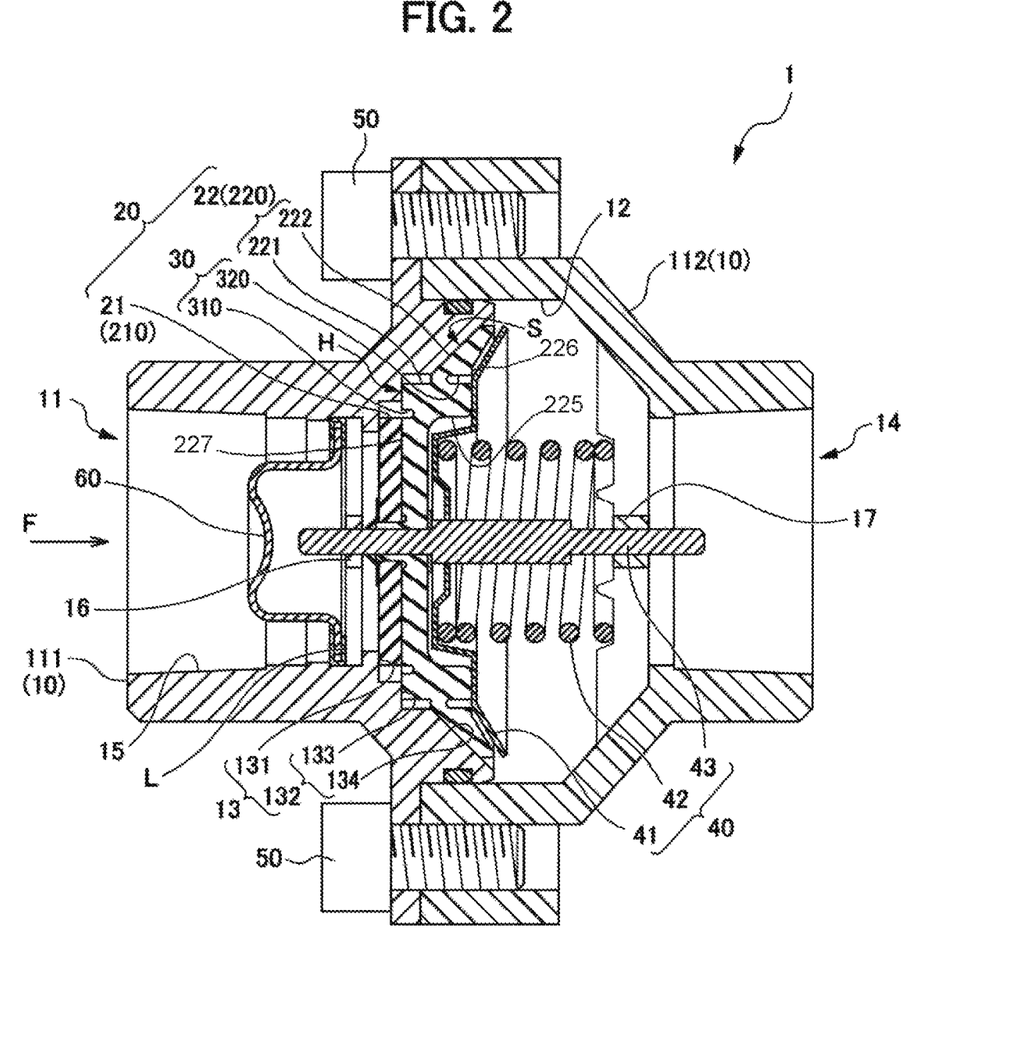
FIG. 2 is a cross-sectional view taken along line A-A of FIG. 1.
Figure 3:
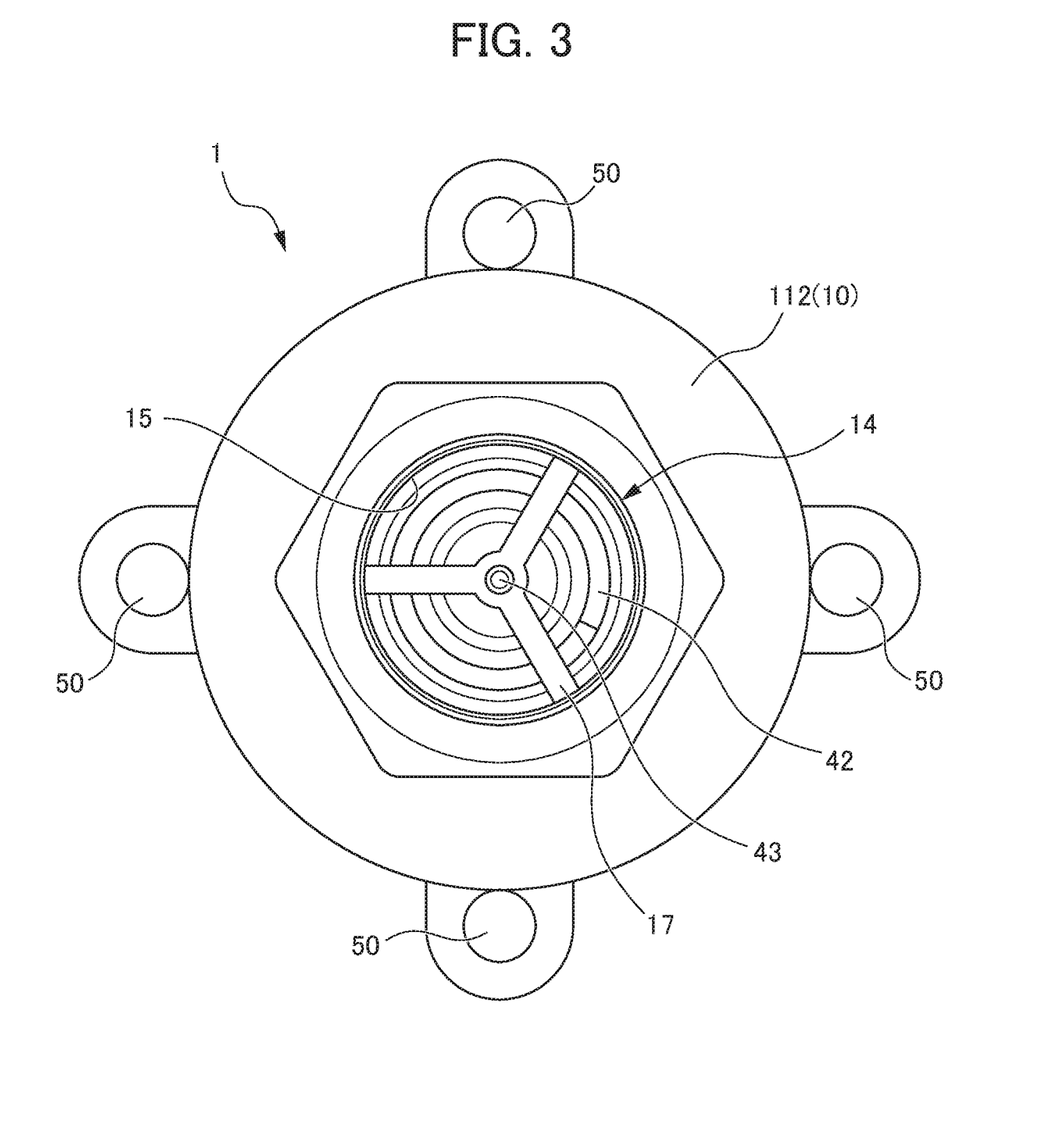
FIG. 3 is a plan view of the check valve of the embodiment as viewed from a secondary side.

As illustrated in FIGS. 1 to 3, a check valve 1 according to the present embodiment includes a casing 10, a valve body 20, an urging unit 40, and a filter 60.

The casing 10 is a member in which a flow path 15 is formed to flow a fluid, and constitutes an outer shape of the check valve 1. The casing 10 includes a fluid inlet 11, a valve chamber 12, a valve seat portion 13, and a fluid outlet 14. The fluid inlet 11 is disposed at an end of a primary side of the flow path 15. The primary side pipe is connected to the fluid inlet 11. The fluid outlet 14 is disposed at an end of a secondary side of the flow path 15. A secondary side pipe is connected to the fluid outlet 14.

A valve chamber 12 is disposed between the fluid inlet 11 and the fluid outlet 14 of the flow path 15, and is formed as a space having a larger diameter than the fluid inlet 11 and the fluid outlet 14. The valve seat portion 13 is formed in a concave shape by the inner wall surface of the valve chamber 12 on the primary side. Details of the valve seat portion 13 will be described later.

In the present embodiment, the casing 10 is formed by combining a first casing 111 constituting the primary side and a second casing 112 constituting the secondary side and fastening the first and second casings together by a bolt 50. The fluid inlet 11, the valve seat portion 13, and a portion of the valve chamber 12 on the primary side are formed in the first casing 111. A portion of the valve chamber 12 on the secondary side and the fluid outlet 14 are formed in the second casing 112.

The valve body 20 is disposed in the valve chamber 12 and is disposed to face the valve seat portion 13. The valve body 20 is formed in a convex shape so as to come into close contact with the valve seat portion 13. Details of the valve body 20 will be described later.

The urging unit 40 is disposed on the secondary side of the valve body 20 of the valve chamber 12. The urging unit 40 urges the valve body 20 toward the valve seat portion 13. The urging unit 40 includes a plate-like body 41, an elastic member 42, and a shaft member 43.

The plate-like body 41 is formed of, for example, a non-elastic material (a metal or the like), and is superposed on the fluid outlet 14 side of the valve body 20. In the present embodiment, the plate-like body 41 is formed in a substantially circular shape having substantially the same diameter as the valve body 20, and is disposed along a surface of the valve body 20 on the secondary side. A plurality of through-holes (not illustrated) are formed in the plate-like body 41. Accordingly, the fluid can flow between the plate-like body 41 and the valve body 20. Therefore, a pressure (a back pressure) of the fluid applied from the fluid outlet 14 side to the fluid inlet 11 side acts on the valve body 20 without being obstructed by the plate-like body 41.

The elastic member 42 is a so-called compression spring, and urges the plate-like body 41 from the fluid outlet 14 side toward the fluid inlet 11 side. The elastic member 42 has one end side disposed in contact with a surface of the plate-like body 41 on the fluid outlet 14 side, and the other end side disposed in contact with the inner surface of the valve chamber 12 on the fluid outlet 14 side. The elastic member 42 contracts when the valve body 20 is pushed by a pressure at which the fluid flows from the fluid inlet 11 side to the fluid outlet 14 side, and thus, the valve body 20 and the plate-like body 41 move to the secondary side and the valve body 20 is separated from the valve seat portion 13. Further, the elastic member 42 extends in a state in which a pressure due to the flowing of the fluid from the fluid inlet 11 side to the fluid outlet 14 side is not applied, and presses the plate-like body 41 and the valve body 20 against the valve seat portion 13 side.

The shaft member 43 is disposed such that a longitudinal direction thereof is along an inflow direction F of the fluid. The shaft member 43 is disposed so as to coincide with the position of a center axis of the elastic member 42. In the present embodiment, a center axis of the shaft member 43 is disposed so as to coincide with a center position of the flow path 15 of the casing 10. The primary side of the shaft member 43 passes through the valve chamber 12 and the secondary side thereof extends to the fluid outlet 14 of the casing 10. The shaft member 43 is inserted through a primary side support member 16 extending radially inward from the casing 10 at a primary side end, and is supported so as to be movable in an axial direction (along the inflow direction F of the fluid) with respect to the casing 10. The shaft member 43 is inserted through a secondary side support member 17 extending radially inward from the casing 10 at a secondary side end, and is supported so as to be movable in the axial direction (along the inflow direction F of the fluid) with respect to the casing 10. The above-described shaft member 43 guides movement of the valve body 20 and the plate-like body 41 to the primary side or the secondary side.

Figure 4:
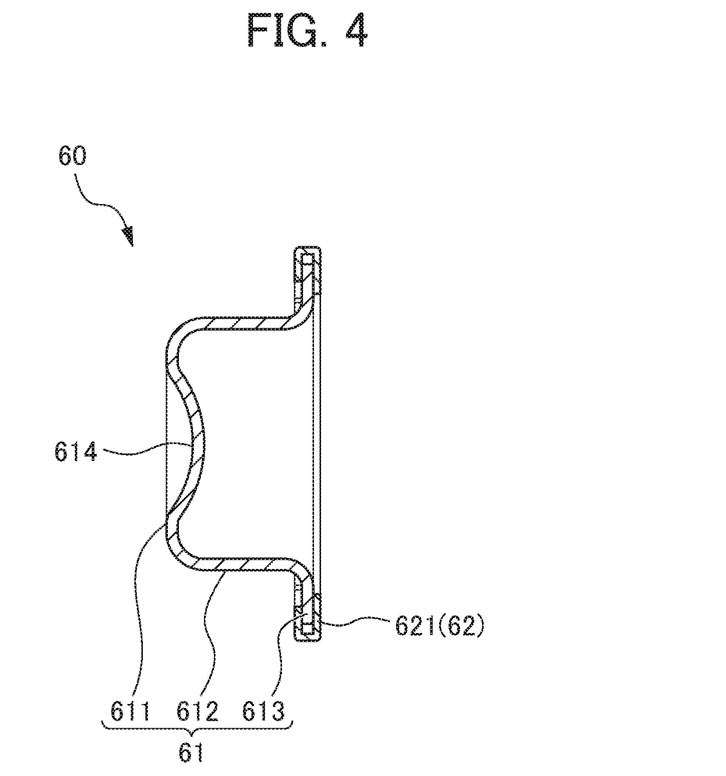
FIG. 4 is a cross-sectional view illustrating a filter of the check valve of the embodiment.

As illustrated in FIG. 2, the filter 60 is disposed on the fluid inlet 11 side of the valve chamber 12 in the flow path 15 of the casing 10. The filter 60 captures the foreign matter having a size greater than or equal to a predetermined size (for example, greater than 1.4 mm), and prevents the foreign matter from entering the valve body 20. As illustrated in FIG. 4, the filter 60 includes a convex filter body 61 having a shape as viewed from the primary side into which the foreign matter flows, and a rib portion 62, and is disposed so that a concave opening faces the fluid outlet 14 side.

As illustrated in FIG. 1, a plurality of apertures are formed in the entire surface of the filter body 61. In the present embodiment, the filter body 61 is formed by a press work of a metal net (for example, a stainless steel net having 14 mesh, a wire diameter of 0.4 mm, and an aperture of 1.4 mm) obtained by braiding metal wires in a mesh shape. Accordingly, the plurality of apertures are formed in the entire surface of the filter body 61. The filter body 61 includes a receiving surface portion 611, a side surface portion 612, and a flange portion 613.

The receiving surface portion 611 is a portion corresponding to a top surface of the convex filter body 61, and is disposed substantially perpendicular to the flow direction F of the fluid. The receiving surface portion 611 is formed in a circular shape when viewed from the front. The receiving surface portion 611 has a concave portion 614 recessed toward the secondary side. The concave portion 614 is formed by curving a center portion of the receiving surface portion 611 to the secondary side in the flow direction F of the fluid.

The side surface portion 612 is a concave portion corresponding to a side surface of the filter body 61, and extends from an outer periphery of the receiving surface portion 611 in a direction along the flow direction F of the fluid. That is, the side surface portion 612 is formed in a cylindrical shape extending from the entire circumference of the receiving surface portion 611 toward the secondary side in the flow direction F of the fluid. The side surface portion 612 is integrally formed with the receiving surface portion 611. In the present embodiment, the side surface portion 612 extends in a direction bent by approximately 90 degrees with respect to the receiving surface portion 611.

The flange portion 613 extends substantially perpendicularly to the flow direction F of the fluid from a tip end side of the side surface portion 612 (a side opposite to the receiving surface portion 611, which is a base end side). In the present embodiment, the flange portion 613 is formed integrally with the filter body 61 by bending a mesh-shaped metal net at the tip end portion of the side surface portion 612. The flange portion 613 constitutes a part of the rib portion 62, as described later.

The rib portion 62 extends substantially perpendicularly to the flow direction F of the fluid from the tip end side of the side surface portion 612 (the side opposite to the receiving surface portion 611, which is the base end side). A cut-out or a gap through which a fluid can flow is formed in the rib portion 62. The rib portion 62 includes the above-described flange portion 613 and the plate member 621.

Figure 5:
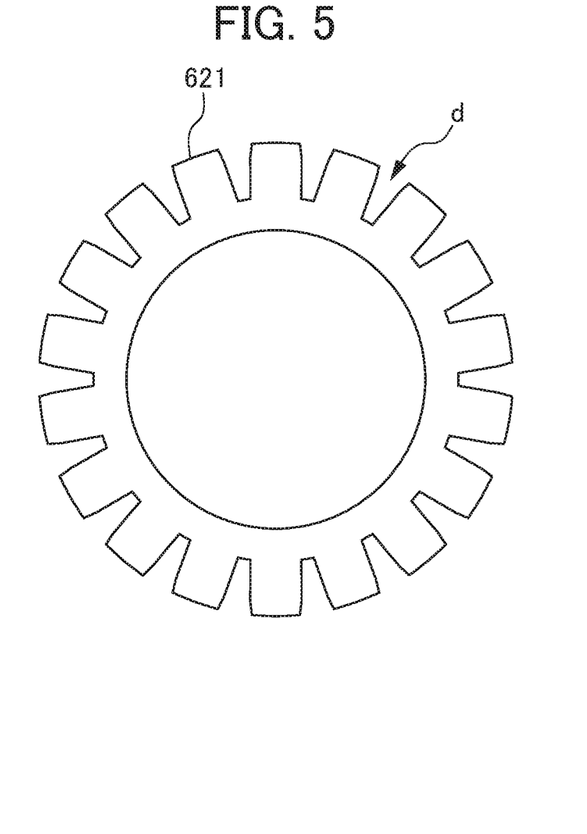
FIG. 5 is a plan view illustrating a state before an outer periphery side of a plate member of the check valve of the embodiment is bent.
Figure 6:
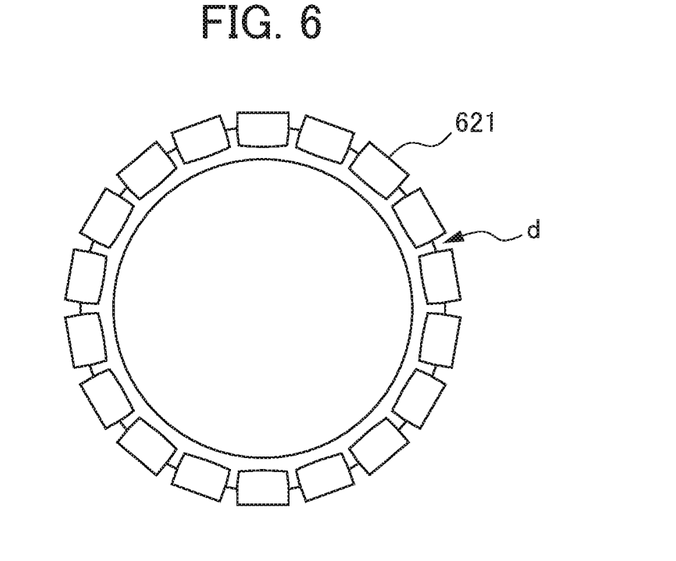
FIG. 6 is a plan view illustrating a state in which the outer periphery side of the plate member of the check valve of the embodiment is bent.

As illustrated in FIG. 5, the plate member 621 is formed in an annular shape in which notches d are formed at predetermined intervals on the outer periphery. The inner diameter of the plate member 621 is substantially the same as the inner diameter of the side surface portion 612. Then, as illustrated in FIG. 6, the plate member 621 is bent so that a part of each of the notches d at a predetermined interval remains. As illustrated in FIG. 2, the plate member 621 is bent so as to sandwich the flange portion 613 therebetween, so that the fluid can flow through a portion of the notch d.

The above-described filter 60 is disposed in the first casing 111 with the rib portion 62 supported by a portion L, of the casing 10, which supports the rib portion 62. In the filter 60, as illustrated in FIGS. 1 and 2, the receiving surface portion 611 is disposed on the primary side (the fluid inlet 11 side), and the rib portion 62 (the flange portion 613) is disposed on the secondary side (the fluid outlet 14 side). Accordingly, the filter 60 is disposed such that the opening side (the tip end side) faces the valve chamber 12. A cut-out or a gap through which a fluid can flow is also formed in the portion L, of the casing 10, which supports the rib portion 62 (not illustrated).

The receiving surface portion 611 allows passage of the fluid flowing at a center portion of the flow path 15 out of the fluid flowing from the primary side to the secondary side. Accordingly, the receiving surface portion 611 can capture the foreign matter mixed in the fluid flowing from the primary side to the secondary side. The formation of the concave portion 614 in the receiving surface portion 611 improves a strength of the receiving surface portion 611 as compared to a case where only a plane that is perpendicular to the inflow direction F of the fluid is formed in the receiving surface.

The side surface portion 612 and the rib portion 62 allow passage of the fluid flowing from the outer periphery side of the flow path 15 out of the fluid flowing from the primary side to the secondary side. Here, in this embodiment, the side surface portion 612 includes a plurality of apertures and is disposed along the inflow direction F of the fluid, to allow passage of a portion of the fluid while preventing the side surface portion 612 from clogging with the foreign matter. In addition, since the cut-out or gap through which a fluid can flow is formed in the rib portion 62 and the portion L, of the casing 10, which supports the rib portion 62, the fluid passing through the rib portion 62 can also flow into the valve chamber 12.

Accordingly, a flow along the inflow direction F can be formed on the outer periphery side of the side surface portion 612, and a part of the fluid flowing on the outer periphery side of the side surface portion 612 can flow from the side surface portion 612 and a part thereof can be guided to the rib portion 62. Therefore, a pressure loss due to disposition of the filter 60 can be reduced. In addition, since the plate member 621 protects the flange portion 613 corresponding to a terminal end of the filter body 61 formed by weaving the metal wire, it is possible to prevent the filter body 61 from being damaged by loosening of the metal wire and to maintain a shape of the filter 60.

Next, the valve seat portion 13 and the valve body 20 of the present embodiment will be described in detail.

As illustrated in FIG. 2, the valve seat portion 13 includes a first valve seat portion 131 and a second valve seat portion 132. The first valve seat portion 131 is formed as a vertical surface perpendicular to the inflow direction F of the fluid (a plane along a radial direction of the flow path 15). The first valve seat portion 131 is disposed on the fluid inlet 11 side of the valve chamber 12. Specifically, the first valve seat portion 131 is disposed so as to surround the outer periphery of an inlet of the valve chamber 12 out of the inner wall surface of the valve chamber 12 on the fluid inlet 11 side. In the present embodiment, the first valve seat portion 131 is disposed in an annular shape along the outer periphery of the inlet of the valve chamber 12.

The second valve seat portion 132 is disposed on an outer periphery side of the first valve seat portion 131. The second valve seat portion 132 includes a vertical surface 133 and an inclined surface 134.

The vertical surface 133 is formed as a surface perpendicular to the inflow direction F of the fluid. The vertical surface 133 is formed as a surface on an inner periphery side, out of the surfaces forming the second valve seat portion 132. The vertical surface 133 is disposed along the outer periphery of the first valve seat portion 131. In the present embodiment, the vertical surface 133 is disposed so as to form a step with respect to the first valve seat portion 131, and is disposed closer to the fluid outlet 14 than the first valve seat portion 131.

The inclined surface 134 is formed as an inclined surface such that an angle formed with the inflow direction F of the fluid becomes an acute angle. In other words, the inclined surface 134 is formed as an inclined surface inclined so as to gradually increase in diameter along the inflow direction F of the fluid (from the fluid inlet 11 toward the fluid outlet 14). The inclined surface 134 is formed as a surface on an outer periphery side, out of the surfaces forming the second valve seat portion 132. The inclined surface 134 is disposed along an outer periphery of the vertical surface 133. In the present embodiment, the inclined surface 134 is disposed so as to form a step with respect to the vertical surface 133, and is disposed closer to the fluid outlet 14 than the vertical surface 133.

The valve body 20 includes a first valve body 21, a second valve body 22, and a hinge portion 30. The first valve body 21 is formed of a non-elastic material (for example, a metal such as a stainless steel) having a predetermined hardness in order to maintain a mechanical strength of the valve body 20 against contact with the valve seat portion 13 due to the back pressure of the fluid (a pressure from the fluid outlet 14 side to the fluid inlet 11 side). The first valve body 21 has substantially the same thickness as the step between the first valve seat portion 131 and the vertical surface 133 of the second valve seat portion 132. The first valve body 21 is formed in a disk shape having a diameter larger than an inner diameter of the first valve seat portion 131 (a diameter of the inlet of the valve chamber 12) and smaller than or equal to an outer diameter of the first valve seat portion 131 so as to be able to come into close contact with the first valve seat portion 131. The first valve body 21 is inserted on the shaft member 43 in a center position thereof and is fixed to the shaft member 43.

Accordingly, the first valve body 21 is disposed so as to be movable together with the shaft member 43 along the inflow direction F of the fluid. The first valve body 21 is disposed in the valve chamber 12 such that the radial direction thereof is perpendicular to the inflow direction F of the fluid. That is, in the first valve body 21, the surface of the fluid inlet 11 side is disposed to be substantially parallel to the first valve seat portion 131 and is disposed to face the first valve seat portion. The first valve body 21 constitutes a first seal portion 210 which comes into close contact with the first valve seat portion 131.

The second valve body 22 is formed of an elastic material (for example, a synthetic rubber such as a fluorine rubber, a silicone rubber, or the like) and has a frusto-conical shape in which a surface (225) on a lower bottom (226) side is recessed. In the second valve body 22, an upper bottom (227) formed to have a smaller diameter than the lower bottom (226), is disposed so as to be superposed on the surface of the first valve body 21 on the fluid outlet 14 side. The diameter of the upper bottom (227) of the second valve body 22 is larger than a diameter of the first valve body 21 and an inner diameter of the vertical surface 133 of the second valve seat portion 132, and is smaller than an outer diameter of the vertical surface 133 of the second valve seat portion 132. A side surface of the second valve body 22 is formed in accordance with an inclination angle of the inclined surface 134 of the second valve seat portion 132. The second valve body 22 is inserted on the shaft member 43 in a center position thereof and is fixed to the shaft member 43. Accordingly, the second valve body 22 is disposed so as to be movable together with the shaft member 43 along the inflow direction F of the fluid. The second valve body 22 constitutes a second seal portion 220 which comes into close contact with the second valve seat portion 132.

The second seal portion 220 is formed at a position, of the second valve seat portion 132, which does not overlap with the first valve body 21 (the first seal portion 210) in the inflow direction F of the fluid. That is, the second seal portion 220 is formed by a portion, of the second valve body 22, which is disposed on an outer periphery side of the first valve body 21. A thickness of the second seal portion 220 is formed so as to gradually become thinner toward the outer periphery side (refer to FIGS. 7 to 9). The second seal portion 220 has a flexibility such that the second seal portion can be bent by a pressure (a back pressure) applied from the fluid outlet 14 side to the fluid inlet 11 side and come into close contact with the second valve seat portion 132. The second seal portion 220 includes a vertical seal portion 221 and an inclined seal portion 222.

The vertical seal portion 221 is disposed along the outer periphery of the first valve body 21. Specifically, the vertical seal portion 221 is formed in an annular shape with an upper surface, of the second valve body 22, which is exposed from the first valve body 21, as a vertical surface H. The vertical surface H of the vertical seal portion 221 is disposed to face the vertical surface 133 of the second valve seat portion 132.

The vertical seal portion 221 is formed to be the thickest part of the second seal portion 220.

The inclined seal portion 222 is formed along an outer periphery of the vertical seal portion 221. That is, the inclined seal portion 222 is formed in an annular shape having the side surface of the second valve body 22 as an inclined surface S. The inclined surface S of the inclined seal portion 222 is disposed to face the inclined surface 134 of the second valve seat portion 132. In the present embodiment, the inclined seal portion 222 is formed to extend radially outward from a side surface of the vertical seal portion 221, and is formed to become gradually thinner along an extension direction. That is, a thickness of the inclined seal portion 222 is formed to gradually decrease toward the outer periphery side.

The hinge portion 30 is disposed at a position of the second seal portion 220, and serves as a starting point of bending of the second seal portion 220. Specifically, the hinge portion 30 is formed as a groove cut out from a surface of the second seal portion 220 along the flow direction of the fluid (the inflow direction F or the opposite direction thereto). The hinge portion 30 includes a first hinge portion 310 and a second hinge portion 320.

The first hinge portion 310 is formed as a groove cut out from the upper bottom (227) of the second valve body 22. The first hinge portion 310 is formed in an annular shape along the outer periphery of the first valve body 21 (the first seal portion 210). That is, the first hinge portion 310 is formed in an annular shape along the outer periphery of the first valve body 21 (the first seal portion 210), as a groove cut out from the vertical surface H of the vertical seal portion 221.

The second hinge portion 320 is formed as a groove cut out from the lower bottom (226) of the second valve body 22. The second hinge portion 320 is formed in an annular shape along the outer periphery of the vertical seal portion 221. That is, the second hinge portion 320 is formed in an annular shape along the outer periphery of the vertical seal portion 221, as a groove cut out from the surface of the inclined seal portion 222 on the fluid outlet 14 side.

According to the valve body 20, the valve seat portion 13, and the hinge portion 30 as described above, the first seal portion 210 comes into close contact with the first valve seat portion 131, and thus, the inlet of the valve chamber 12 can be sealed. Further, the second seal portion 220 comes into close contact with the second valve seat portion 132, and thus, the inlet of the valve chamber 12 can be further sealed.

Here, since the first hinge portion 310 is provided, the vertical seal portion 221 and the inclined seal portion 222 can be easily bent from the first hinge portion 310 as a starting point. In addition, since the second hinge portion 320 is provided, the inclined seal portion 222 can be more easily bent. In addition, since the inclined seal portion 222 and the inclined surface 134 of the second valve seat portion 132 are formed at an acute angle with respect to the inflow direction F of the fluid, the flowing of the fluid can be smoother than a case where the seal portion and the surface are formed vertically, from a viewpoint of pressure loss.

The check valve 1 as described above is used as follows. First, the fluid inlet 11 of the casing 10 (the first casing 111) is connected to the primary side pipe (not illustrated). The fluid outlet 14 of the casing 10 (the second casing 112) is connected to a secondary side pipe (not illustrated).

When no fluid flows between the primary side pipe (not illustrated) and the secondary side pipe (not illustrated), the fluid inside the check valve 1 also does not move. At this time, the valve body 20 becomes a state of coming into close contact with the valve seat portion 13 by an urge by the urging unit 40. Specifically, the elastic member 42 urges the valve body 20 from the fluid outlet 14 side to the fluid inlet 11 side, and thus, the first seal portion 210 comes into close contact with the first valve seat portion 131. In addition, the vertical seal portion 221 (the vertical surface H) of the second seal portion 220 comes into close contact with the vertical surface 133 of the second valve seat portion 132. Then, the inclined seal portion 222 (the inclined surface S) of the second seal portion 220 is in close contact with the inclined surface 134 of the second valve seat portion 132. Accordingly, the inlet of the valve chamber 12 is sealed, so that no movement of the fluid occurs between the fluid inlet 11 side and the fluid outlet 14 side.

When the flowing of the fluid from the fluid inlet 11 side (primary side) to the fluid outlet 14 side (secondary side) starts, the valve body 20 receives a force that is to move from the fluid inlet 11 side to the fluid outlet 14 side by the pressure of the fluid. In other words, the valve body 20 receives a force to move in a direction against a pressure of the urging unit 40 by the pressure of the fluid. The elastic member 42 is contracted by the force to move the valve body 20, and the valve body 20 and the plate-like body 41 move together with the shaft member 43 in a direction away from the valve seat portion 13 along the inflow direction F of the fluid. Accordingly, the first seal portion 210 is separated from the first valve seat portion 131. In addition, the vertical seal portion 221 and the inclined seal portion 222 of the second seal portion 220 are separated from the vertical surface 133 and the inclined surface 134 of the second valve seat portion 132. Therefore, sealing between the valve seat portion 13 and the valve body 20 is released, and the fluid can flow from the fluid inlet 11 side to the fluid outlet 14 side.

On the other hand, when the fluid is to flow backward from the fluid outlet 14 side to the fluid inlet 11 side, the valve body 20 and the plate-like body 41 receives a force to move from the fluid outlet 14 side to the fluid inlet 11 side by the pressure of the fluid (back pressure). Further, the valve body 20 and the plate-like body 41 receive a force to move from the fluid outlet 14 side to the fluid inlet 11 side by the urging force of the urging unit 40. Accordingly, the valve body 20 and the plate-like body 41 start moving toward the valve seat portion 13 along the inflow direction F of the fluid together with the shaft member 43.

At this time, the plate-like body 41 transmits an urging force of the elastic member 42 to the entire surface of the second seal portion 220 on the fluid outlet 14 side. This prevents the second seal portion 220 from bending from the fluid inlet 11 side to the fluid outlet 14 side as the second seal portion moves toward the second valve seat portion 132.

When the fluid in the valve chamber 12 enters between the second seal portion 220 and the plate-like body 41, the second seal portion 220 is bent from the fluid outlet 14 side to the fluid inlet 11 side by the pressure applied from the fluid outlet 14 side to the fluid inlet 11 side. That is, the vertical seal portion 221 is bent toward the vertical surface 133 of the second valve seat portion 132, and the inclined seal portion 222 is bent toward the inclined surface 134 of the second valve seat portion 132. At this time, the first hinge portion 310 serves as a starting point of the bending of the vertical seal portion 221 and the inclined seal portion 222, and the second hinge portion 320 serves as a starting point of the bending of the inclined seal portion 222.

Therefore, when the valve body 20 moves toward the valve seat portion 13, sealing by the second seal portion 220 starts before sealing by the first seal portion 210. In the sealing formed by the second seal portion 220, the second seal portion comes into close contact with the inclined surface 134 from the tip end (the outer periphery side) of the inclined seal portion 222 in an extension direction. After a base portion of the inclined seal portion 222 comes into close contact with the inclined surface 134, the vertical seal portion 221 comes into close contact with the vertical surface 133. That is, the sealing by the valve body 20 is performed in order from the fluid outlet 14 side to the fluid inlet 11 side.

Accordingly, it is possible to prevent a fluid having a high pressure (a fluid having a pressure on the fluid outlet 14 side) from remaining between the valve body 20 and the wall surface of the valve chamber 12 on the fluid inlet 11 side. Further, it is possible to prevent the valve body 20 from being unintentionally separated from the valve seat portion 13 by the pressure applied to the valve body 20 from the remaining fluid. Furthermore, since the second seal portion 220 starts sealing before the sealing by the first seal portion 210, it is possible to prevent the first seal portion 210 from making a strong contact with the first valve seat portion 131.

Finally, the first seal portion 210 comes into close contact with the first valve seat portion 131 by the urging force of the elastic member 42 and the pressure of the fluid from the fluid outlet 14 side to the fluid inlet 11 side. Further, the second seal portion 220 comes into close contact with the second valve seat portion 132 by the urging force of the elastic member 42 and the bending due to the pressure of the fluid from the fluid outlet 14 side to the fluid inlet 11 side. As this manner, the valve body 20 comes into close contact with the valve seat portion 13, and thus, the inlet of the valve chamber 12 is sealed, so that the backflow of the fluid from the fluid outlet 14 side to the fluid inlet 11 side is prevented.

By the way, the filter 60 captures the foreign matter mixed in the fluid flowing from the primary side to the secondary side, thereby preventing the foreign matter having a size equal to or larger than a predetermined size from entering the positions of the valve body 20 and the valve seat portion 13. On the other hand, when the foreign matter having a size less than a predetermined size that has passed through the filter 60 enters between the valve body 20 and the valve seat portion 13, the valve body 20 operates as follows in order to prevent the backflow of the fluid.

Figure 7:
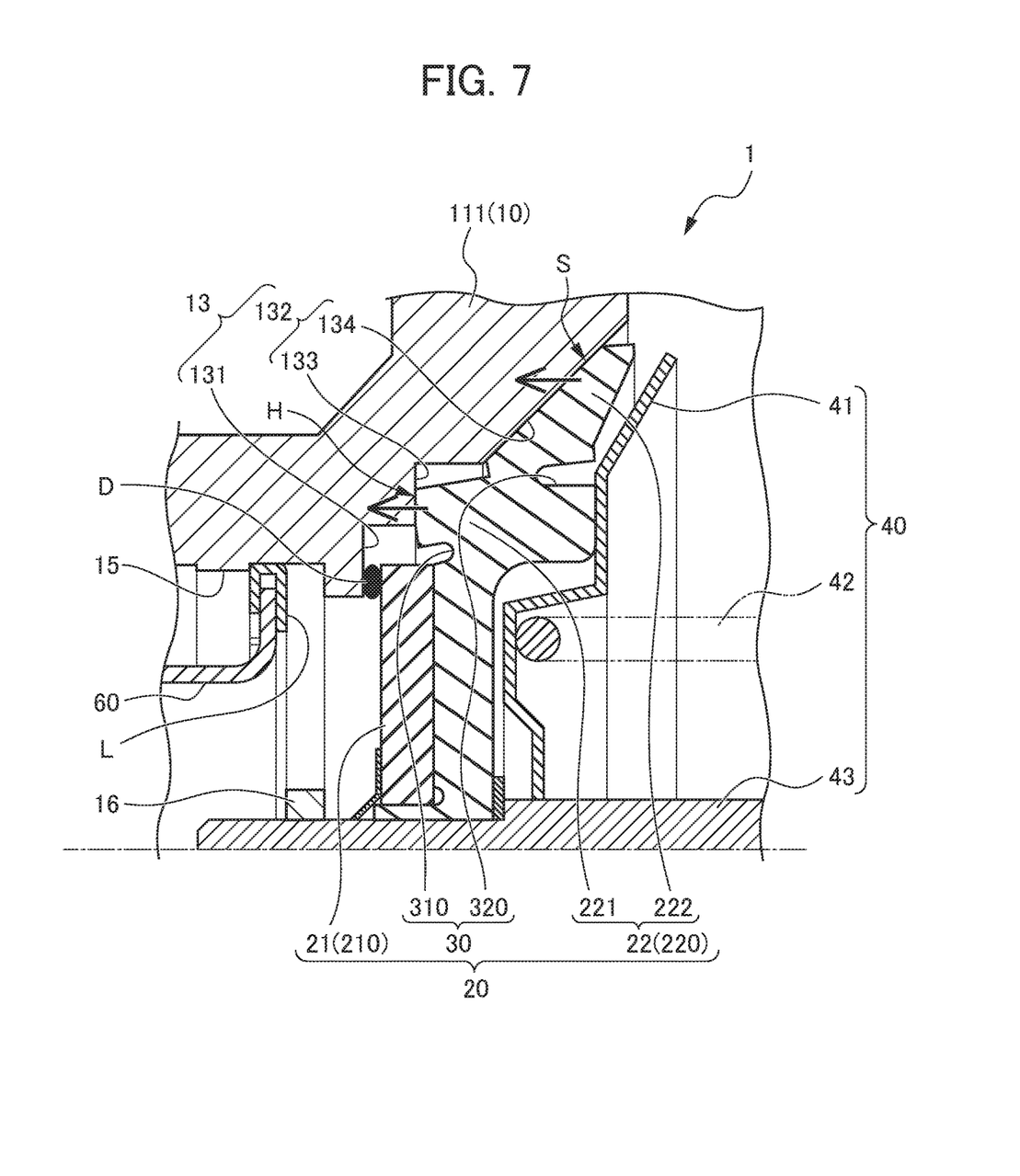
FIG. 7 is a schematic cross-sectional view of the check valve of the embodiment illustrating an operation of a second valve seat portion when foreign matter enters between a first seal portion and a first valve seat portion.

First, as illustrated in FIG. 7, when the foreign matter D enters between the first seal portion 210 and the first valve seat portion 131, the first seal portion 210 formed of a non-elastic material cannot come into close contact with the first valve seat portion 131 because the foreign matter D is caught between the first seal portion 210 and the first valve seat portion 131. Therefore, the first seal portion 210 cannot seal the fluid inlet 11 of the valve chamber 12. The second seal portion 220 cannot move to the second valve seat portion 132 because the first seal portion 210 cannot come into close contact with the first valve seat portion 131. At this time, the pressure of the valve chamber 12 is larger than the pressure of the casing 10 on the fluid inlet 11 side, and thus, the fluid is to flow backward from the valve chamber 12 to the fluid inlet 11 side of the casing 10.

The fluid to flow backward enters between the plate-like body 41 and the second seal portion 220. Then, the second seal portion 220 formed of an elastic material is bent by the pressure applied from the fluid outlet 14 side to the fluid inlet 11 side and the elastic force of the elastic member 42, and comes into close contact with the second valve seat portion 132. That is, the vertical seal portion 221 is bent to the fluid inlet 11 side from the first hinge portion 310 as a starting point, and thus, the vertical surface H comes into close contact with the vertical surface 133 of the second valve seat portion 132. In addition, the inclined seal portion 222 is bent to the fluid inlet 11 from the second hinge portion 320 as a starting point, and thus, the inclined surface S comes into close contact with the inclined surface 134 of the second valve seat portion 132.

At this time, the hinge portion 30 becomes a starting point of the bending, the second seal portion 220 can be easily bent. Further, the second seal portion 220 can be easily bent by being formed so that the thickness of the second seal portion 220 gradually decreases toward the outer periphery side. Accordingly, even when the fluid inlet 11 of the valve chamber 12 cannot be sealed by the first seal portion 210, the valve body 20 can seal the fluid inlet 11 of the valve chamber 12 by the second seal portion 220, and can prevent the backflow of the fluid.

Figure 8:
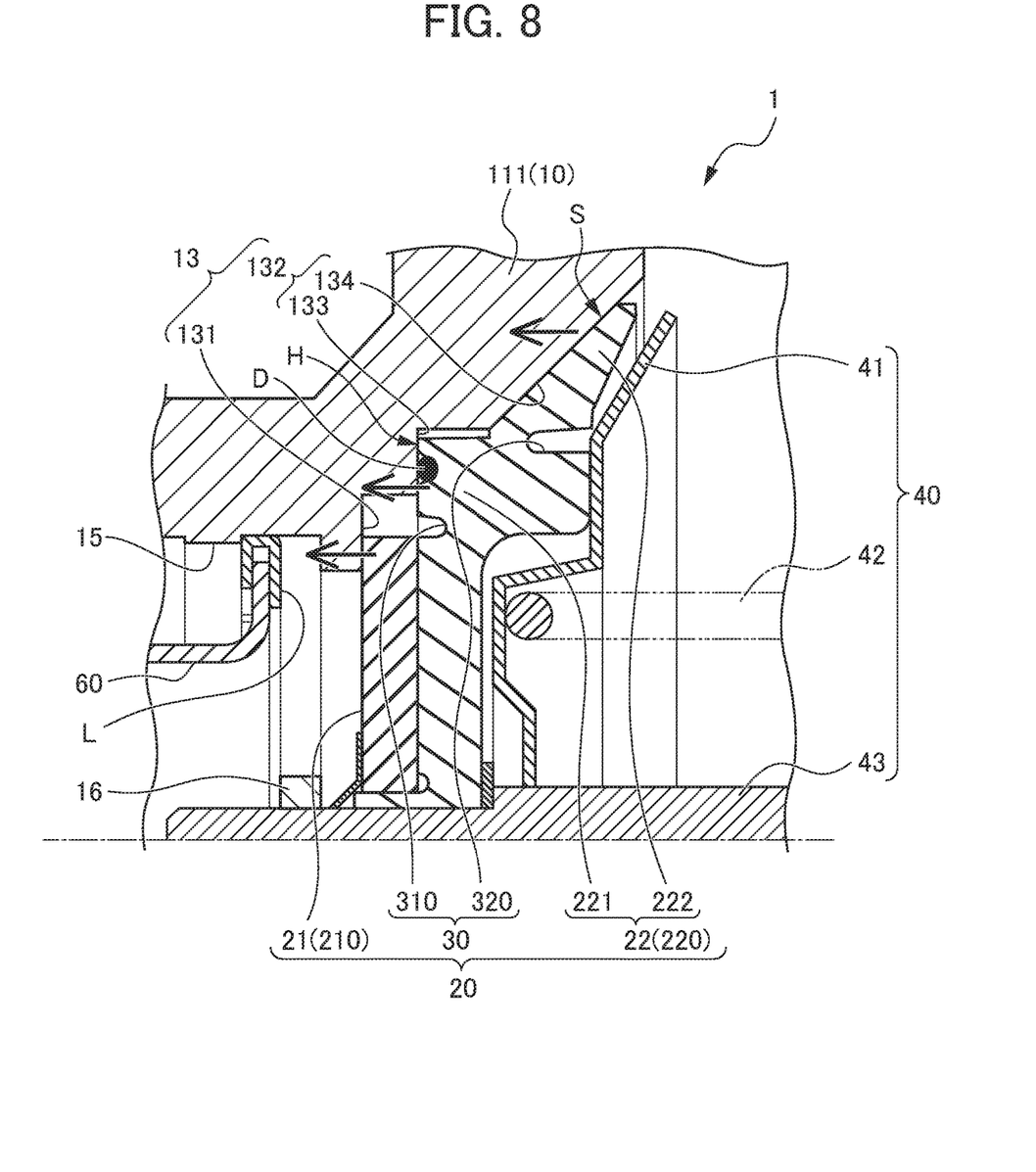
FIG. 8 is a schematic cross-sectional view of the check valve of the embodiment when the foreign matter enters between the second seal portion and a second valve seat portion.

As illustrated in FIG. 8, when the foreign matter D enters between the vertical surface H of the vertical seal portion 221 and the vertical surface 133 of the second valve seat portion 132, the vertical seal portion 221 is deformed to wrap the foreign matter D by the urging force of the elastic member 42 and the pressure applied from the fluid outlet 14 side to the fluid inlet 11 side. Accordingly, the vertical seal portion 221 can move to the vertical surface 133 of the second valve seat portion 132 and come into close contact with the vertical surface. In addition, the first seal portion 210 can come into close contact with the first valve seat portion 131. In addition, the inclined seal portion 222 can come into close contact with the inclined surface 134 of the second valve seat portion 132. Accordingly, the inlet of the valve chamber 12 can be sealed by the first seal portion 210 and the second seal portion 220.

Further, when the first seal portion 210 does not come into close contact with the first valve seat portion 131 even though the deformation of the vertical seal portion 221 is present, the vertical seal portion 221 comes into close contact with the vertical surface 133 of the second valve seat portion 132 by bending from the foreign matter D as a fulcrum. In addition, the inclined seal portion 222 is bent by the pressure of the fluid to flow backward so as to come into close contact with the inclined surface 134 of the second valve seat portion. Accordingly, the inlet of the valve chamber 12 can be sealed by the second seal portion 220, and the backflow of the fluid can be prevented.

Figure 9:
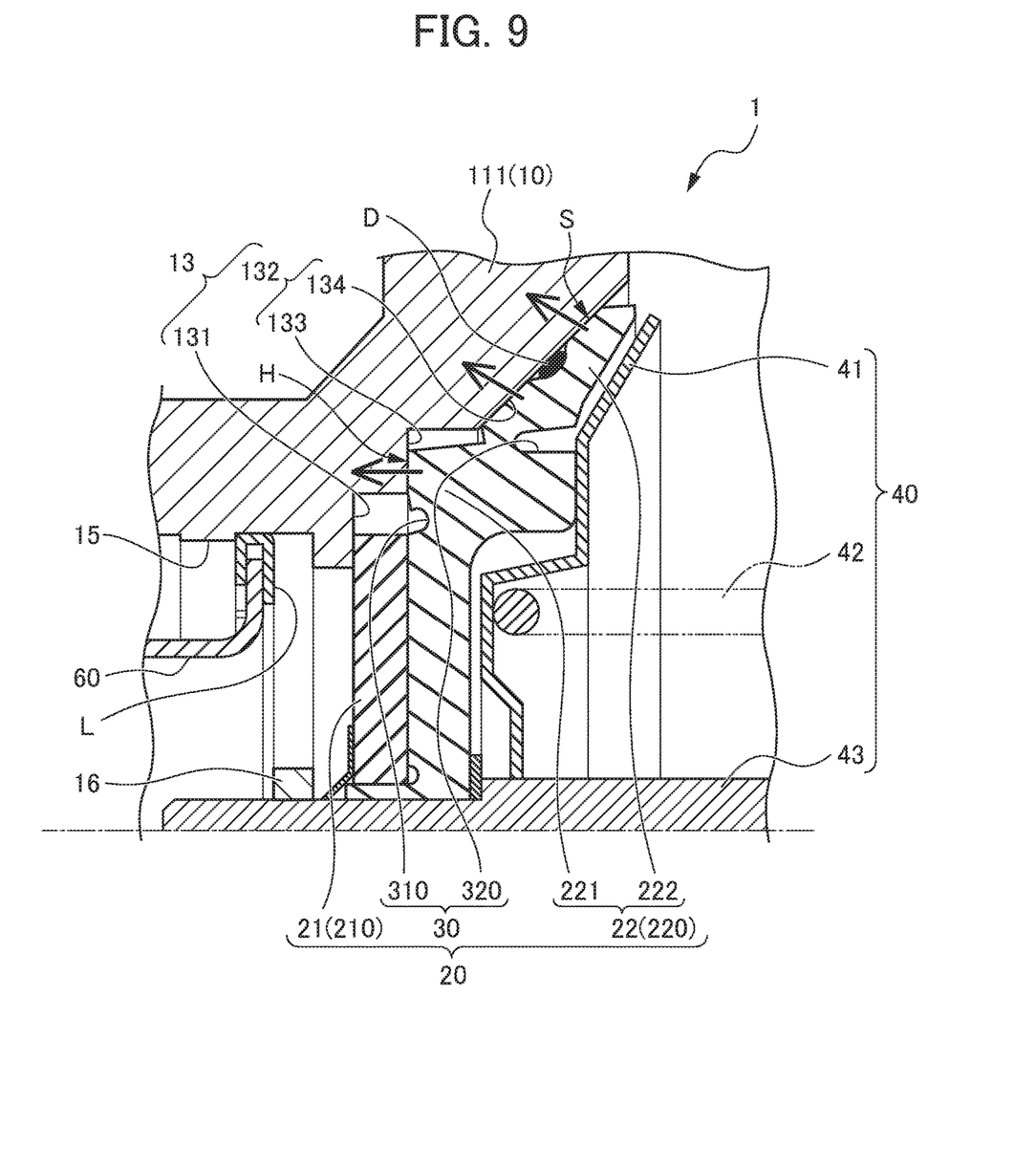
FIG. 9 is a schematic cross-sectional view of the check valve of the embodiment when the foreign matter enters an outer periphery side of a portion between the second seal portion and the second valve seat portion.

Next, as illustrated in FIG. 9, when the foreign matter D enters between the inclined seal portion 222 and the inclined surface 134 of the second valve seat portion 132, the inclined seal portion 222 is deformed to wrap the foreign matter D by the pressure applied from the fluid outlet 14 side to the fluid inlet 11 side. As a result, the inclined seal portion 222 can move to the inclined surface 134 of the second valve seat portion 132 and come into close contact therewith. That is, the first seal portion 210 can come into close contact with the first valve seat portion 131. In addition, the inclined seal portion 222 can come into close contact with the inclined surface 134 of the second valve seat portion 132. Accordingly, the inlet of the valve chamber 12 can be sealed by the first seal portion 210 and the second seal portion 220.

Further, when the first seal portion 210 cannot come into contact with the first valve seat portion 131 even though the deformation of the inclined seal portion 222 is present, the inclined seal portion 222 comes into close contact with the inclined surface 134 of the second valve seat portion 132 by bending from the second hinge portion 320 as a starting point due to the pressure (back pressure) applied from the fluid outlet 14 side to the fluid inlet 11 side. In addition, the tip end side of the inclined seal portion 222 comes into close contact with the inclined surface 134 with the foreign matter D as a fulcrum. The vertical seal portion 221 is bent from the first hinge portion 310 as a starting point by a pressure (back pressure) applied from the fluid outlet 14 side to the fluid inlet 11 side. The vertical seal portion 221 comes into close contact with the vertical surface 133 of the second valve seat portion 132. Accordingly, the inlet of the valve chamber 12 can be sealed by the second seal portion 220, and the backflow of the fluid can be prevented.

Although each preferred embodiment of the check valve of the present invention has been described above, the present invention is not limited to the embodiment described above, and can be modified as appropriate.

Figure 10:
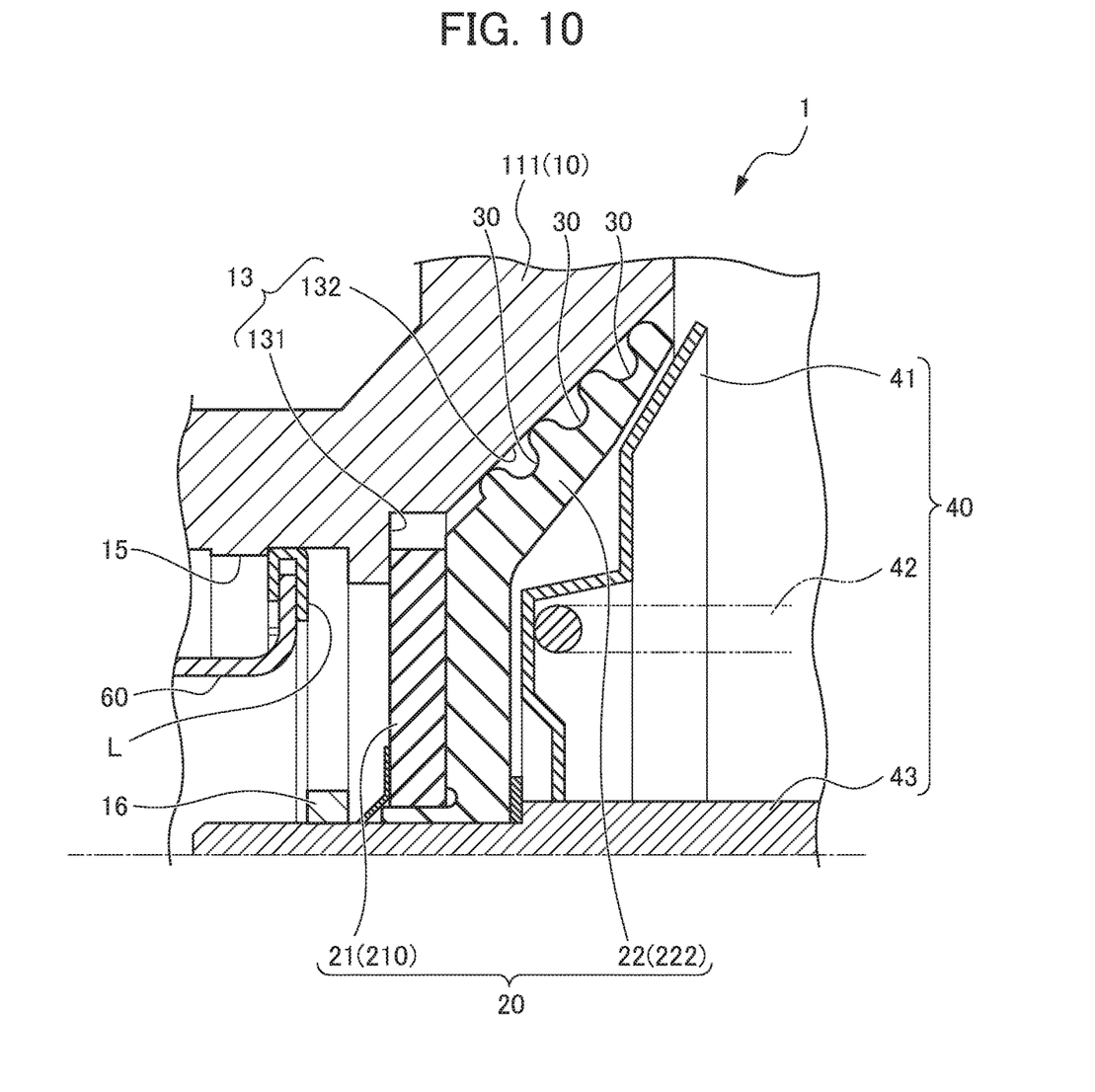
FIG. 10 is a schematic cross-sectional view of a modification example of the check valve of the embodiment.

For example, as illustrated in FIG. 10, a plurality of the hinge portions 30 may be provided on the surface of the second seal portion 220 on the fluid inlet 11 side. Accordingly, the second seal portion 220 can be configured to be more flexible.

In addition, in the above embodiment, the filter body 61 is formed as a mesh-like metal net formed by weaving metal wires, but the present invention is not limited thereto. For example, the filter body 61 may be a punched metal or a resin molded product.

REFERENCE SIGNS LIST 1 check valve
10 casing
11 fluid inlet
12 valve chamber
13 valve seat portion
14 fluid outlet
20 valve body
30 hinge portion
40 urging unit
41 plate-like body
42 elastic member
60 filter
61 filter body
62 rib portion
131 first valve seat portion
132 second valve seat portion
133 vertical surface
134 inclined surface
210 first seal portion
220 second seal portion
221 vertical seal portion
222 inclined seal portion
310 first hinge portion
320 second hinge portion
611 receiving surface portion
612 side surface portion
613 flange portion
614 concave portion
621 plate member
d notch
F inflow direction
L portion supporting rib portion

The invention claimed is:

1. A check valve comprising:
a casing in which a fluid inlet, a valve chamber, a valve seat portion, and a fluid outlet are formed;
a valve body disposed in the valve chamber; and
an urging unit that urges the valve body to the valve seat portion side,
wherein the valve seat portion includes a first valve seat portion disposed on the fluid inlet side of the valve chamber, and a second valve seat portion disposed on an outer periphery side of the first valve seat portion,
wherein the first valve seat portion is formed as a vertical surface to an inflow direction of a fluid,
wherein the second valve seat portion is formed to have a vertical surface to the inflow direction of the fluid, and an inclined surface, being disposed along an outer periphery of the vertical surface, which gradually expands in diameter along the inflow direction of the fluid,
wherein the valve body includes a first seal portion capable of coming into close contact with the first valve seat portion, a second seal portion that is disposed on an outer periphery side of the first seal portion and is capable of coming into close contact with the second valve seat portion, and a first hinge portion and a second hinge portion which are disposed at a position of the second seal portion and each of which is a starting point of bending of the second seal portion,
wherein the first seal portion is formed in a disk shape using a non-elastic material,
wherein the second seal portion: (i) is formed in a recessed frusto-conical shape in which a surface on a lower bottom side is formed of an elastic material; (ii) is formed to have a vertical seal portion disposed to face the vertical surface of the second valve seat portion and an inclined seal portion disposed to face the inclined surface of the second valve seat portion, and (iii) has an upper bottom that is formed to have a smaller diameter than a lower bottom and is disposed to be superposed on a surface of the first seal portion on the fluid outlet side,
wherein the first hinge portion is formed as a groove cut out from a vertical surface of the vertical seal portion, in an annular shape along an outer periphery of the first seal portion, and
wherein the second hinge portion is formed as a groove cut out from a surface of the inclined seal portion on the fluid outlet side, in an annular shape along an outer periphery of the vertical seal portion.

2. The check valve according to claim 1,
wherein a thickness of the second seal portion gradually decreases toward the outer periphery side.

3. The check valve according to claim 2,
wherein the urging unit includes a plate-like body superposed on a surface of the valve body on the fluid outlet side, and an elastic member urging the plate-like body from the fluid outlet side toward the fluid inlet side.

4. The check valve according to claim 3, further comprising:
a filter disposed on a fluid inlet side of the casing,
wherein the filter includes:
(a) a filter body which includes a receiving surface portion disposed substantially perpendicular to a flow direction of the fluid and a side surface portion extending from an outer periphery of the receiving surface portion in a direction along the flow direction of the fluid, and in which a plurality of apertures are formed in the receiving surface portion and the side surface portion, and
(b) a rib portion which extends from a tip end side of the side surface portion in a direction substantially perpendicular to the flow direction of the fluid and is supported by the casing.

5. The check valve according to claim 4,
wherein a cut-out or a gap through which the fluid is capable of flowing is formed in the rib portion and a portion of the casing supporting the rib portion.

6. The check valve according to claim 5,
wherein the receiving surface portion has a concave portion recessed in the flow direction of the fluid.

7. The check valve according to claim 6,
wherein the filter body further includes a flange portion formed to extend from the tip end side of the side surface portion in a direction substantially perpendicular to the flow direction of the fluid, and
wherein the rib portion includes an annular plate member in which notches are formed on an outer periphery of the plate member at predetermined intervals, and is formed such that an outer periphery side of the plate member is bent to sandwich the flange portion.

* * * * *